(12) United States Patent
Sarkar et al.

(10) Patent No.: US 7,921,272 B2
(45) Date of Patent: Apr. 5, 2011

(54) MONITORING PATTERNS OF PROCESSES ACCESSING ADDRESSES IN A STORAGE DEVICE TO DETERMINE ACCESS PARAMETERS TO APPLY

(75) Inventors: Prasenjit Sarkar, San Jose, CA (US); Dinesh Kumar Subhraveti, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/868,465

(22) Filed: Oct. 5, 2007

(65) Prior Publication Data
US 2009/0094431 A1 Apr. 9, 2009

(51) Int. Cl.
*G06F 12/00* (2006.01)
(52) U.S. Cl. .................... 711/168; 711/147; 711/E12.05
(58) Field of Classification Search .................. 711/163, 711/167, 168, 169
See application file for complete search history.

(56) References Cited

U.S. PATENT DOCUMENTS

| | | | |
|---|---|---|---|
| 5,095,421 A * | 3/1992 | Freund | 718/101 |
| 5,129,080 A | 7/1992 | Smith | |
| 5,285,528 A * | 2/1994 | Hart | 710/200 |
| 5,502,840 A | 3/1996 | Barton | |
| 5,590,277 A | 12/1996 | Fuchs et al. | |
| 5,790,851 A * | 8/1998 | Frank et al. | 718/104 |
| 5,805,790 A | 9/1998 | Nota et al. | |
| 5,815,651 A * | 9/1998 | Litt | 714/10 |
| 5,966,543 A | 10/1999 | Hartner et al. | |
| 6,003,066 A | 12/1999 | Ryan et al. | |
| 6,625,635 B1 | 9/2003 | Elnozahy | |
| 6,625,751 B1 | 9/2003 | Starovic et al. | |
| 6,769,073 B1 | 7/2004 | Shapiro | |
| 6,772,367 B1 | 8/2004 | Tarafdar et al. | |
| 6,792,497 B1 * | 9/2004 | Gold et al. | 710/317 |
| 6,832,367 B1 | 12/2004 | Choi et al. | |
| 6,851,075 B2 | 2/2005 | Ur et al. | |

(Continued)

FOREIGN PATENT DOCUMENTS

WO 2006077261 A2 7/2006

OTHER PUBLICATIONS

U.S. Patent Application entitled "Recovery of Application Faults in a Mirrored Application Environment", Serial No. unknown, filed Oct. 5, 2007, by inventors R.E. Harper and D.K. Subhraveti.

(Continued)

*Primary Examiner* — Reginald G Bragdon
*Assistant Examiner* — Gurtej Bansal
(74) *Attorney, Agent, or Firm* — David W. Victor; Konrad Raynes and Victor LLP

(57) ABSTRACT

Provided are a method, system, and article of manufacture for monitoring patterns of processes accessing addresses in a storage device to determine access parameters to apply. Processes accessing addresses of data in a storage device are monitored. The processes are granted access to the addresses according to first access parameters that indicate how to arbitrate access by processes to the addresses. A condition occurring in response to a pattern of processes accessing addresses is detected. A determination is made of one of the processes in the pattern and the address accessed by the determined process. Indication is made that second access parameters apply for the determined address. The second access parameters are used to grant access to the determined address for subsequent accesses of the indicated address.

30 Claims, 5 Drawing Sheets

U.S. PATENT DOCUMENTS

| | | | |
|---|---|---|---|
| 6,866,162 B2 * | 3/2005 | Morris, Sr. | 220/288 |
| 6,920,634 B1 | 7/2005 | Tudor | |
| 6,961,865 B1 | 11/2005 | Ganesh et al. | |
| 7,062,583 B2 | 6/2006 | Kolinummi et al. | |
| 7,185,236 B1 | 2/2007 | Moser et al. | |
| 7,206,964 B2 | 4/2007 | Moser et al. | |
| 7,240,057 B2 * | 7/2007 | Kingsbury et al. | 707/8 |
| 7,290,105 B1 | 10/2007 | Jeter, Jr. et al. | |
| 2002/0013802 A1 | 1/2002 | Mori et al. | |
| 2002/0083149 A1 | 6/2002 | Van Huben et al. | |
| 2004/0177130 A1 | 9/2004 | Chambliss et al. | |
| 2004/0236990 A1 | 11/2004 | Pavlik et al. | |
| 2005/0071760 A1 | 3/2005 | Jaeger | |
| 2005/0149634 A1 | 7/2005 | McKenney | |
| 2005/0177821 A1 | 8/2005 | Ogata et al. | |
| 2005/0251794 A1 | 11/2005 | Taylor et al. | |
| 2005/0262411 A1 | 11/2005 | Vertes et al. | |
| 2006/0085784 A1 | 4/2006 | Traut et al. | |
| 2006/0136640 A1 | 6/2006 | Tuan | |
| 2006/0143512 A1 | 6/2006 | Jia et al. | |
| 2006/0184935 A1 | 8/2006 | Abels et al. | |
| 2008/0209422 A1 | 8/2008 | Coha | |
| 2009/0119549 A1 * | 5/2009 | Vertes | 714/47 |

OTHER PUBLICATIONS

U.S. Patent Application entitled "Varying Access Parameters for Processes to Access Memory Addresses in Response to Detecting a Condition Related to a Pattern of Processes Access to Memory Addresses", Serial No. unknown, filed Oct. 5, 2007, by inventors P. Sarkar and D.K. Subhraveti.

U.S. Patent Application entitled "Providing a Process Exclusive Access to a Page Including a Memory Address to Which a Lock is Granted to the Process", Serial No. unknown, filed Oct. 5, 2007, by inventors P. Bergheaud, D.K. Subhraveti and M.P. Vertes.

Bergheaud, et al., "Fault Tolerance in Multiprocessor Systems Via Application Cloning", 27th International Conference on Distributed Computing Systems, 2007, pp. 1-10.

Christiaens, et al., "Record/Replay in the Presence of Benign Data Races", 2002, pp. 1-7.

Daniel, et al., "Transparent Process Replication", 2000, pp. 1-6.

Dunlap, et al., "ReVirt: Enabling Intrusion Analysis Through Virtual-Machine Logging and Replay", Proceedings of the 2002 Symposium on Operating Systems Design and Implementation (OSDI), 2002, pp. 1-14.

He, et al., "Preemption Adaptivity in Time-Published Queue-Based Spin Locks", Dept. of Computer Science University of Rochester, NY, 2005, pp. 1-12.

Huangs, et al., "Handling Catastrophic Failures in Scalable Internet Applications", IEEE, 2004, pp. 1-7.

Krammer et al., "MARMOT: An MPI Analysis and Checking Tool", High Performance Computer Center Stuttgart, Germany, 2004, pp. 1-6.

Kranzmuller, "Event Graph Analysis for Debugging Massively Parallel Programs", Dept. for Graphics and Parallel Processing Joh. Kepler University Linz, Austria, Sep. 2000, pp. 1-344.

Lim, "Reactive Synchronization Algorithms for Multiprocessors", Massachusetts Institute of Technology, 1995, pp. 1-162.

Marathe, et al., "Composite Abortable Locks", IEEE, 2006, pp. 1-10.

Mellor-Crummey, et al., "A Software Instruction Counter", ACM, 1989, pp. 78-86.

Osman et al., "The Design and Implementation of Zap: A System for Migrating Computing Environments", Proceedings of the 5th Symposium on Operating Systems Design and Implementation (OSDI 2002), Dec. 2002, pp. 1-16.

Russinovich, et al., "Operating System Support for Replay of Concurrent Non-Deterministic Shared Memory Applications", Dept. of Computer Science University of Oregon, 1996, pp. 1-5.

Slye, et al., "Support for Software Interrupts in Log-Based Rollback-Recovery", 26th Symposium on Fault-Tolerant Computer Systems, Jun. 1996, pp. 1-20.

Third Office Action for U.S. Appl. No. 11/868,445, dated Nov. 18, 2010, 10 pgs.

* cited by examiner

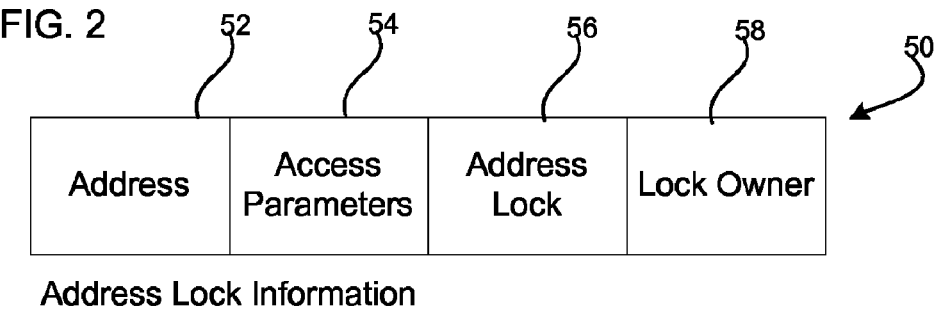
Address Lock Information
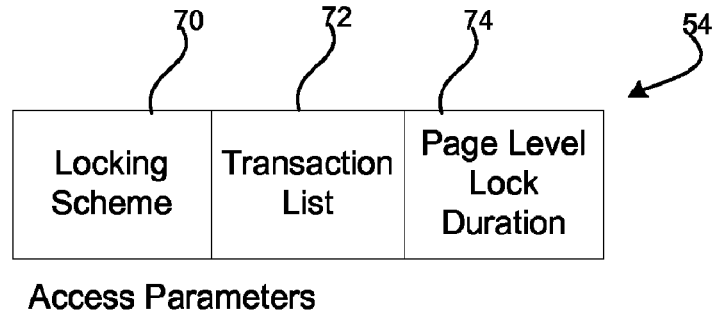
Access Parameters
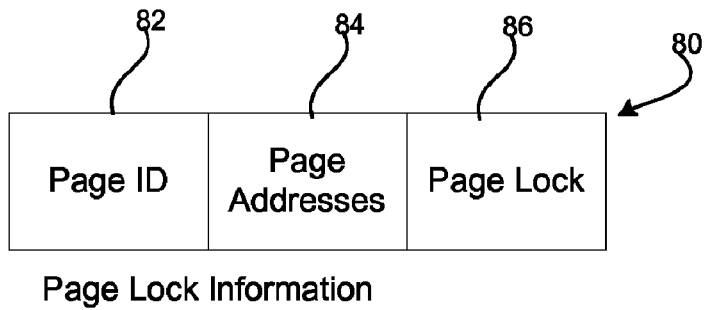
Page Lock Information
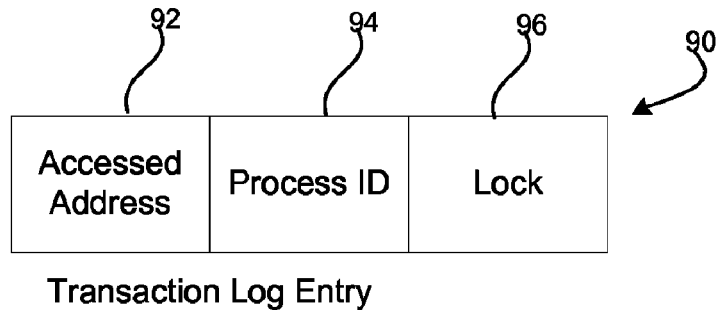
Transaction Log Entry

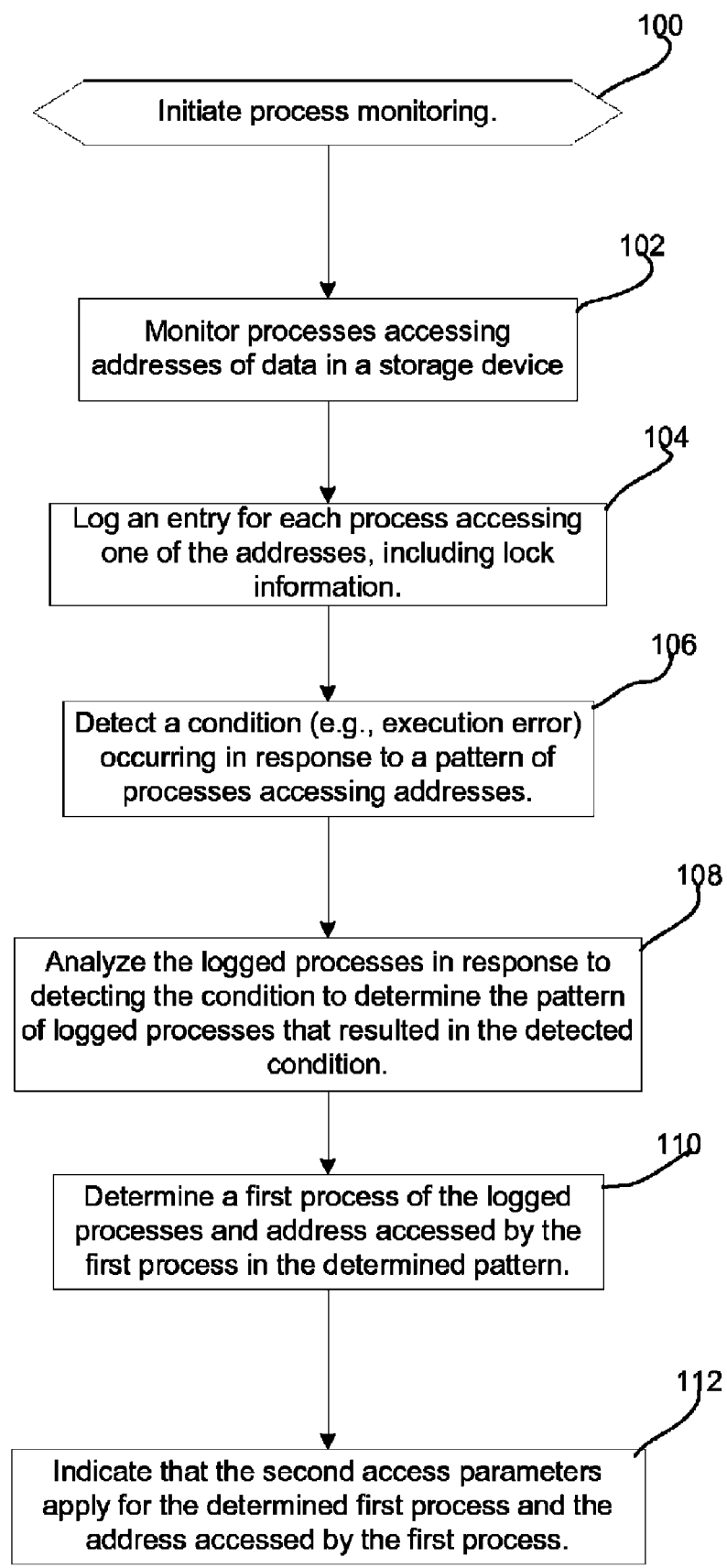

MONITORING PATTERNS OF PROCESSES ACCESSING ADDRESSES IN A STORAGE DEVICE TO DETERMINE ACCESS PARAMETERS TO APPLY

BACKGROUND OF THE INVENTION

1. Field of the Invention

The present invention relates to a method, system, and article of manufacture for monitoring patterns of processes accessing addresses in a storage device to determine access parameters to apply.

2. Description of the Related Art

Application processes may concurrently access memory addresses in a shared memory. A process may comprise one or more threads allocated processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions. To access the memory addresses, the processes must obtain a spinlock for each address. If the spinlock is not available or granted to another process, then the process must repeatedly check until the spinlock becomes available. Application processes may experience an execution error based on a non-deterministic pattern of accesses. For instance, a certain non-deterministic access pattern of requests for memory addresses may result in a deadlock or other locking errors due to a race condition. A race condition occurs when separate processes or threads of execution depend on some shared state. A deadlock refers to a specific condition when two or more processes, such as in a multi-processor environment, are each waiting for the process to release a shared resource, such as a lock for a resource, or more than two processes are waiting for resources in a circular chain.

Troubleshooting of errors resulting from non-deterministic access patterns of the shared resource may be difficult to predict or replicate because many access patterns for the same set of processes may not produce an error. Thus, even if the developer is alerted of the problem, the developer may not be able to reproduce the access pattern or conditions that lead to the error. Further, during product development, the developer may not be able to take into account all access patterns that may occur when testing concurrent processes on multiple processors, and may not experience the error because the problem access pattern was not realized during testing conditions.

There is a need in the art for improved techniques for avoiding errors resulting from non-deterministic access patterns of computer resources, such as memory addresses in a shared memory.

SUMMARY

Provided are a method, system, and article of manufacture for monitoring patterns of processes accessing addresses in a storage device to determine access parameters to apply. Processes accessing addresses of data in a storage device are monitored. The processes are granted access to the addresses according to first access parameters that indicate how to arbitrate access by processes to the addresses. A condition occurring in response to a pattern of processes accessing addresses is detected. A determination is made of one of the processes in the pattern and the address accessed by the determined process. Indication is made that second access parameters apply for the determined address. The second access parameters are used to grant access to the determined address for subsequent accesses of the indicated address.

In a further embodiment, the second access parameters prevent the pattern of processes occurring that resulted in the detected condition.

In a further embodiment, the first access parameters indicate a first locking scheme required by the processes to access the addresses to which the first access parameters apply and the second access parameters specify a second locking scheme for the determined address to which the second access parameters apply.

In a further embodiment, the second access parameters apply to the determined process accessing the determined address and the first access parameters apply to processes other than the determined process accessing the determined address.

In a further embodiment, a request is received from a requesting process comprising one of the processes for a requested address comprising one of the addresses in the storage device. A determination is made as to whether the first or second locking scheme applies to the requesting process and the requested address. A determination is made as to whether a lock is held for the requested address in response to determining that the first locking scheme applies. The requesting process is granted the lock for the requested address in response to determining that the lock is available.

In a further embodiment, a determination is made as to whether a lock is held for a block of addresses including the requested address in response to determining that the second locking scheme applies. The requesting process is granted the lock for the block of address to allow the requesting process to access the requested address in response to determining that the second locking scheme applies to the requesting process and the requested address.

In a further embodiment, the requesting process releases the lock for the requested address in response to completing the operation with respect to the requested address when the first locking scheme applied.

In a further embodiment, the requesting process releases the lock granted according to the second locking scheme after a lock duration.

In a further embodiment, the lock duration indicates at least one of a time period and a predetermined number of instructions executed by the requesting process.

In a further embodiment, the storage device comprises a memory device, the block of addresses comprises a page of addresses in the memory device, and the processes are spawned by an operating system to perform tasks for an application.

In a further embodiment, the detected condition comprises an execution error and the first and second access parameters specify different locking mechanisms for the addresses.

In a further embodiment, detecting the condition occurring in response to the pattern of processes accessing addresses comprises logging information on each process accessing one of the addresses; analyzing the logged processes in response to detecting the condition to determine the pattern of logged processes that resulted in the detected condition; and determining a first process of the logged processes in the determined pattern, wherein the second access parameters are indicated to apply to the address accessed by the determined first process.

In a further embodiment, the logged processes comprise processes granted exclusive access to the accessed address and the first and second access parameters specify different locking mechanisms required to access the addresses.

BRIEF DESCRIPTION OF THE DRAWINGS

FIG. 2 illustrates an embodiment of address lock information.

FIG. 3 illustrates an embodiment of access parameters for managing access to a memory address.

FIG. 4 illustrates an embodiment of page lock information.

FIG. 5 illustrates an embodiment of a transaction log entry.

FIG. 6 illustrates an embodiment of operations to monitor processes accessing a shared memory and determine access parameters to apply to processes accessing the memory addresses.

DETAILED DESCRIPTION

Figure 1:
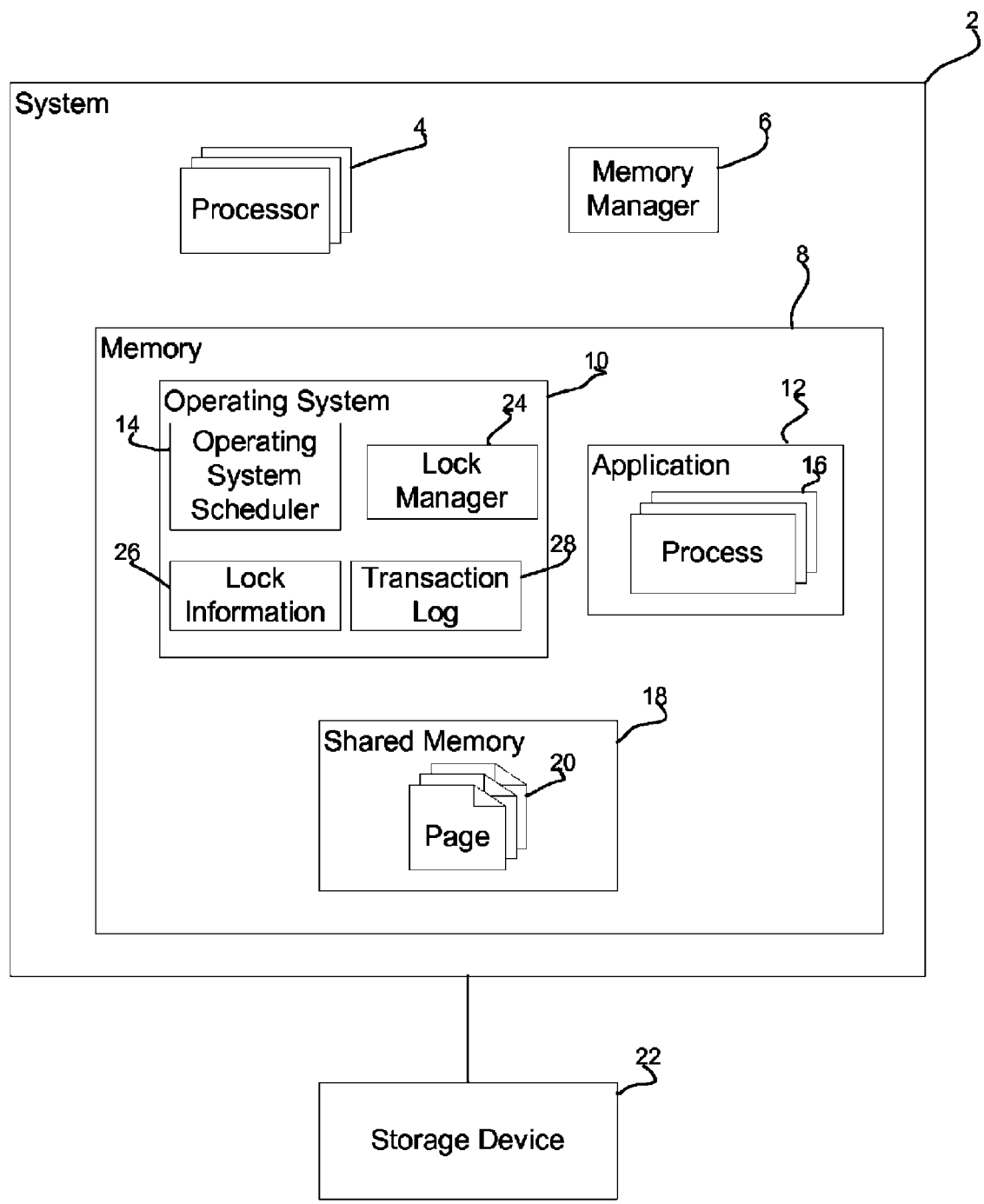
FIG. 1 illustrates an embodiment of a computing environment.

FIG. 1 illustrates an embodiment of a computing environment. A system 2 includes multiple processors 4, and a memory manager 6 managing access to a memory 8. The processor 4 loads into the memory 8 an operating system 10 providing a runtime environment for one or more applications 12. An operating system scheduler 14 may spawn tasks 16 that perform the application 12 operations. The processes 16 may comprise processes, threads, other units of executions allocated by the operating system, etc. The processes 16 may be executed by one or more of the processors 4 and may concurrently access a shared memory 18. The shared memory 18 includes pages 20. The memory manager 6 may map received virtual addresses used by the operating system 10 and processes 16 to addresses in one of the pages 20. The data in the pages 20 may include data used by application processes 16 and data from a storage 22 coupled to the system 2. Pages 20 may be stored in the shared memory 18 or swapped to the storage 22 if there is not sufficient space for all the pages 20 in the memory 18.

If a process 16 references a memory address that resolves within a page 20 that is not available in the shared memory 18, then the memory manager 6 generates a page fault to the operating system 10 to cause the operating system 10 to load the required page 20 from a paging file in the storage 22.

If a process 16 requires access to a memory address in a page 20 to write to the page 20, then the operating system 10 would invoke a lock manager 24 to determine if the memory address is available for an exclusive lock. The lock manager 24 checks lock information 26 to determine whether to grant a lock for the process 16 requesting access to the memory address. If the lock is granted, then the process 16 may write to the memory address. The lock manager 24 maintains a transaction log 28 in which the lock manager 24 logs an entry for each process 16 obtaining a lock to access a memory address.

In one embodiment, the lock manager 24 operations may be performed outside of the kernel space of the operating system 10 and execute within the application space without intervention from the operating system 10 or hardware. For instance, if the lock manager 24 is granting spinlocks to processes 16, then the lock manager 24 operations and spinlocks may be maintained within the user application space. Upon receiving a spinlock for a memory address in the shared memory 18, the requesting process 16 receiving the spinlock would access the resource covered by the spinlock. If another process 16 tries to access the resource covered by a granted spinlock, then that process 16 will retry the request after a predefined period until the spinlock is acquired. In alternative embodiments, the lock manager 24 may operate within the operating system 24 kernel space and grant lock types other than spinlocks.

FIG. 2 illustrates an embodiment of lock address information 50 maintained in the lock information 26 for each memory address that may be accessed in a page 20. The lock address information 50 indicates a memory address 52 for which the lock information applies, such as a virtual address; access parameters 54 that indicate a locking scheme or some other access mechanism to use for the memory address 52; an address lock 56 indicate whether an exclusive lock is held for the address; and a lock owner 58 indicating the process 16 holding the lock 56 for the address.

FIG. 3 illustrates an embodiment of the access parameters 54 that may be maintained for a lock. The access parameters 54 may indicate a locking scheme 70, such as a first locking scheme requiring an address level lock and/or a second locking scheme requiring a page level lock of the page including the address 52 for processes 16 indicated in a process list 72; and a page level lock duration 74 indicating a duration during which processes 16 in the list 72 hold the page level lock for the page. The page lock duration 74 may be set at a higher level to apply to all access parameters 54 indicating a page level locking scheme, and not within individual access parameters.

In one embodiment, the first locking scheme applies to processes not indicated in the list 72 and the second locking scheme, if indicated, applies to processes 16 indicated in the list 72. In one embodiment, the first locking scheme may comprise an address level locking scheme, such that processes 16 not indicated in the list 72 need only acquire an exclusive lock for the specific memory address 52, such as a spin lock. The address level locking scheme may comprise a spinlock, such that a process 16 attempts to obtain the exclusive spinlock for an address and if the spinlock is not available, then the process 16 retries to obtain the spinlock until it is available or a timeout occurs.

The second locking scheme may comprise a page level locking scheme, such that processes 16 indicated in the list 72 must acquire a lock for a page 20 including the requested memory address. In further embodiments, a process 16 may hold the page level lock for a lock duration 74, where the lock duration may comprise a period of time, e.g., number of clock cycles, process time slice, etc., or a number of executed instructions that the process holding the lock must perform with respect to the address for which the lock is held and/or other addresses before the lock is released.

In the described embodiments, the second locking scheme provides a lock for a page including addresses. In a further embodiment, the second locking scheme may require a lock for a block of addresses other than a memory page. In one embodiment, the first locking scheme requires a lock for a memory address. In a further embodiment, the first locking scheme may require a lock for a requested word and the second locking scheme may require a lock for the requested word and words near the requested word.

FIG. 4 illustrates an embodiment of page lock information 80 that may be included with the lock information 26, where the page lock information 80 for one page 20 indicates a page identifier (ID) 82; page addresses 84 included in the page; and a page lock 86 indicating whether a lock has been granted for the page. The lock manager 24 may indicate the page 82 as locked 86 in response to assigning a page lock to a process 16 indicated in the list 72.

FIG. 5 illustrates an embodiment of an en entry 90 in the transaction log 28 for each process 16 accessing a memory address indicating an accessed address 92, a process ID 94 of the process that accessed the address 92, and a lock 96 obtained for the access. The log 28 may maintain a list of entries 90 in the order in which the processes 16 accessed the shared memory 18.

Described embodiments provide for a technique performed by a component of the operating system 10, such as the lock manager 24 or some other monitoring component, to monitor patterns of address access request to determine if a non-deterministic pattern of access requests results in a condition or undesirable outcome, such as an execution error, deadlock, bug, etc. The lock manager 24 (or other monitoring component) may alter the access pattern by changing the locking mechanism to prevent the detected non-deterministic pattern resulting in the error from occurring in the future. For instance, a deadlock may occur in a situation where a page 20 includes three spinlocks S1, S2, and S3 for three different memory addresses. If three processes P1, P2, and P3 acquire spinlocks S1, S2, and S3, respectively, and then P1, P2, and P3 wait to obtain spinlocks S2, S3, and S1, respectively, then P1, P2, and P3 will not release their currently held locks until the new lock is obtained. This results in a deadlock, because P1 will not release S1 until S2 is released by P2, which will not occur unless P3 releases S3, which P2 requires next.

In the described embodiments, upon this undesirable access pattern occurring, the lock manager 24 may change the locking mechanism for process P1 accessing S2 to require that P1 obtain a page lock 86 for the page 20 including S2 and hold for a duration 74 including multiple processes in the page. This change in the locking mechanism to page or block level allows P1 to obtain S1 and S2 without being deadlocked by P2 and P3, which must now wait for P1 to release the page level lock.

FIG. 6 illustrates an embodiment of operations performed by the lock manager 24 (or some other monitoring component of the operating system 10) to monitor for non-deterministic access patterns resulting in undesirable conditions, such as errors and deadlocks, and changing the locking mechanism or access parameters to avoid such problematic patterns in the future. Upon initiating (at block 100) process monitoring, the lock manager 24 monitors (at block 102) processes 16 accessing addresses of data in the shared memory 18. The monitored address may comprise the virtual addresses applications 12 and the operating system 10 use to address memory locations or the physical memory addresses. The lock manager 24 logs (at block 104) an entry 90 for each process 16 accessing one of the addresses, including lock information 96 in a log entry 90. In response to detecting (at block 106) a condition (e.g., execution error, deadlock, race condition, etc.) occurring in response to a pattern of processes 16 accessing addresses, the lock manager 24 analyzes (at block 108) the logged processes 90 to determine the pattern of logged processes that resulted in the detected condition, e.g., execution error, deadlock, etc.

The lock manager 24 may then determine (at block 110) a first process of the logged processes 90 and the address accessed by the first process in the determined pattern. The lock manager 24 may then indicate (at block 112) that the second access parameters, i.e., the second locking scheme, applies for the determined first process and the address accessed by the first process. As part of indicating that the second access parameters apply, the lock manager 24 may indicate the second locking scheme in the locking scheme 70 parameter for the address 52 accessed by the first process and indicate the determined first process in the process list 72. In this way, the first locking scheme or access parameters (e.g., address level spinlock) applies for processes not indicated in the list 72 and the second locking scheme (second access parameters) applies to processes 16 indicated in the list 72.

Figure 7:
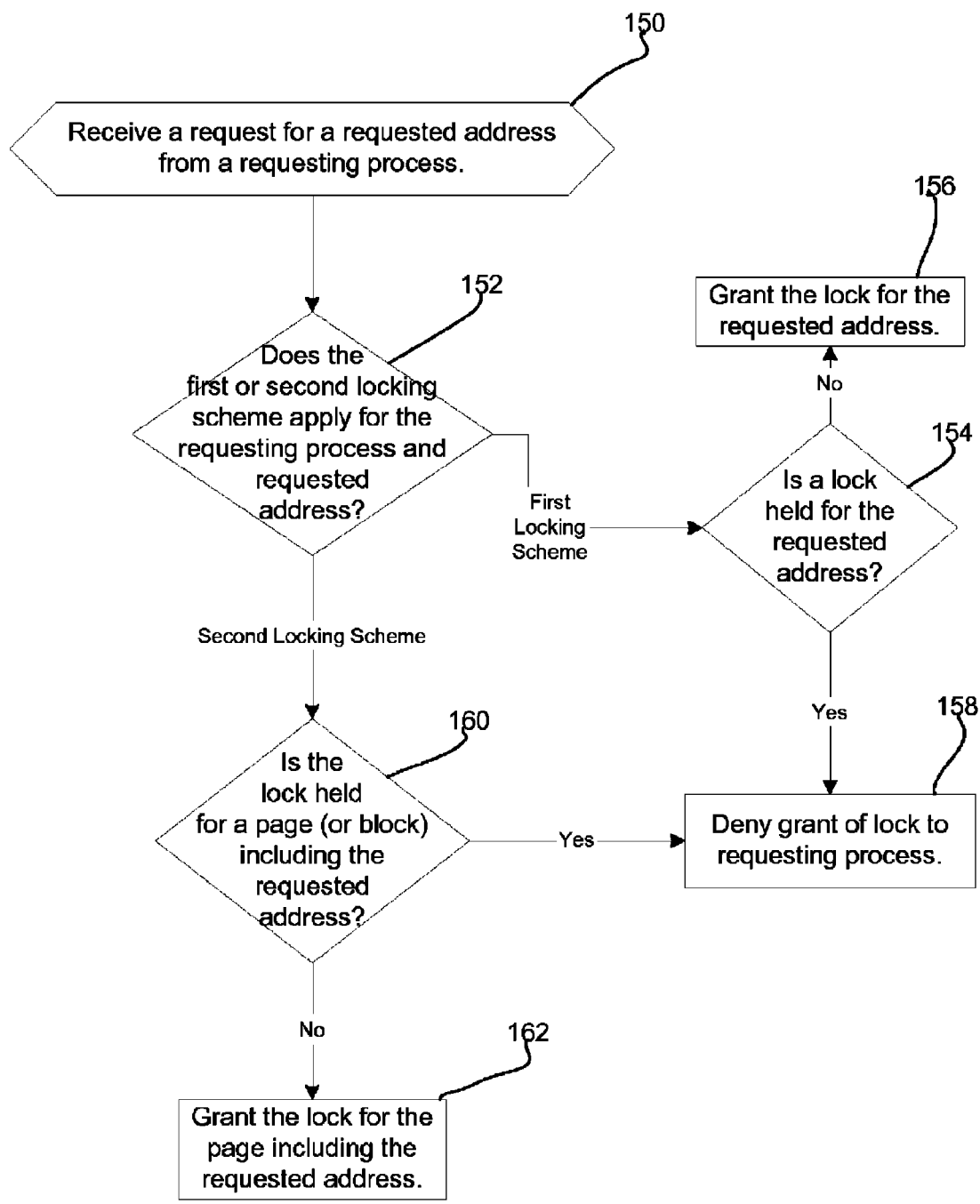
FIG. 7 illustrates an embodiment of operations to process a process request for a requested address and determine a lock for the requested address.

FIG. 7 illustrates an embodiment of operations performed by the lock manager 24 (or some other components of the operating system 10) to process a request for exclusive access to an address in the shared memory 18. Upon receiving (at block 150) a request for a requested address from a requesting process 16, the lock manager 24 determines (at block 152) whether the first or second locking scheme applies for the requesting process and the requested address. The locking scheme may be determined from the access parameters 54 for the requested address, indicating whether a second locking scheme applies (e.g., page level lock) and whether the scheme applies to the requesting process, e.g., whether the requesting process 16 is indicated in the process list 72. If (at block 152) the first locking scheme applies to the requesting process and requested address, then a determination is made (at block 154) as to whether an address level lock 56 (FIG. 2), e.g., spinlock, applies to the requested address. If (at block 154) no lock is held, then the lock for the address 56 is granted (at block 156) and the requesting process 16 becomes the lock owner 58 (FIG. 2). If (at block 154) a lock 56 is held for the requested address, then the lock is denied (at block 158), and the requesting process may retry the request to access the lock.

If (at block 152) the second locking scheme, e.g., page level as indicated in field 70, applies to the requesting process and the requested address, then the lock manager 24 determines (at block 160) whether the page lock 86 is held for the page 20 (or block) including the requested address from the page lock information 80 (FIG. 4) for the page 20 including the requested address. If (at block 160) the page lock 86 is held by another process 16, then the lock request is denied (at bock 158). Otherwise, if (at block 160) the page lock 86 is not held, then the lock manager 24 grants (at block 162) the lock 86 for the page 20 including the requested address for the requesting process 16 to hold for the page lock duration 74, which may cover multiple processes with respect to address in the page 20.

Figure 8:
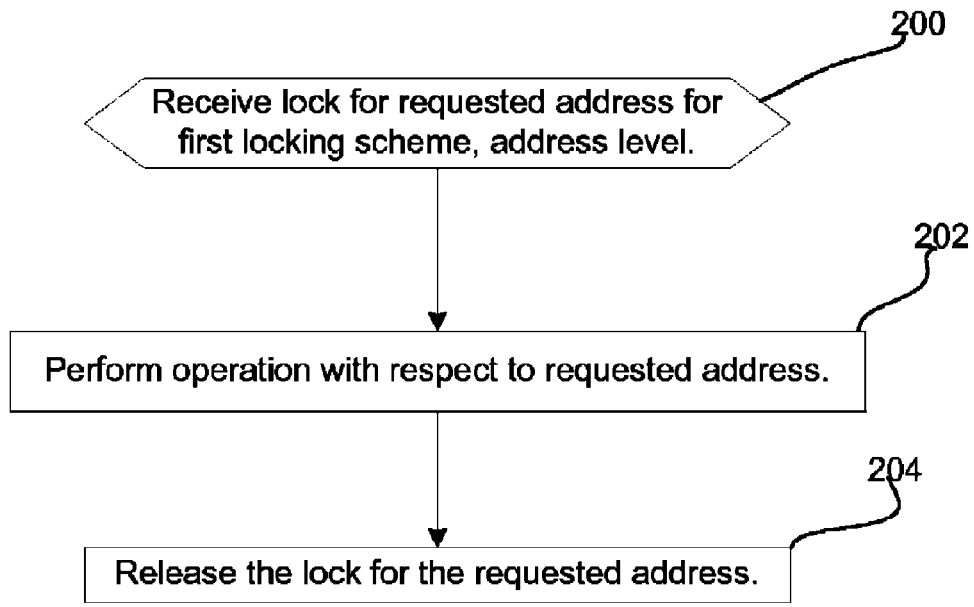
FIGS. 8 and 9 illustrate embodiments of operations for a process to perform with respect to a memory address and release a lock obtained for a memory address.

FIG. 8 illustrates an embodiment of operations performed by processes 16 receiving an address lock 56. Upon receiving (at block 200) an address level lock for the first locking scheme, the process 16 performs (at block 202) the operations with respect to the requested address and releases (at block 204) the requested address after performing the operation.

Figure 9:
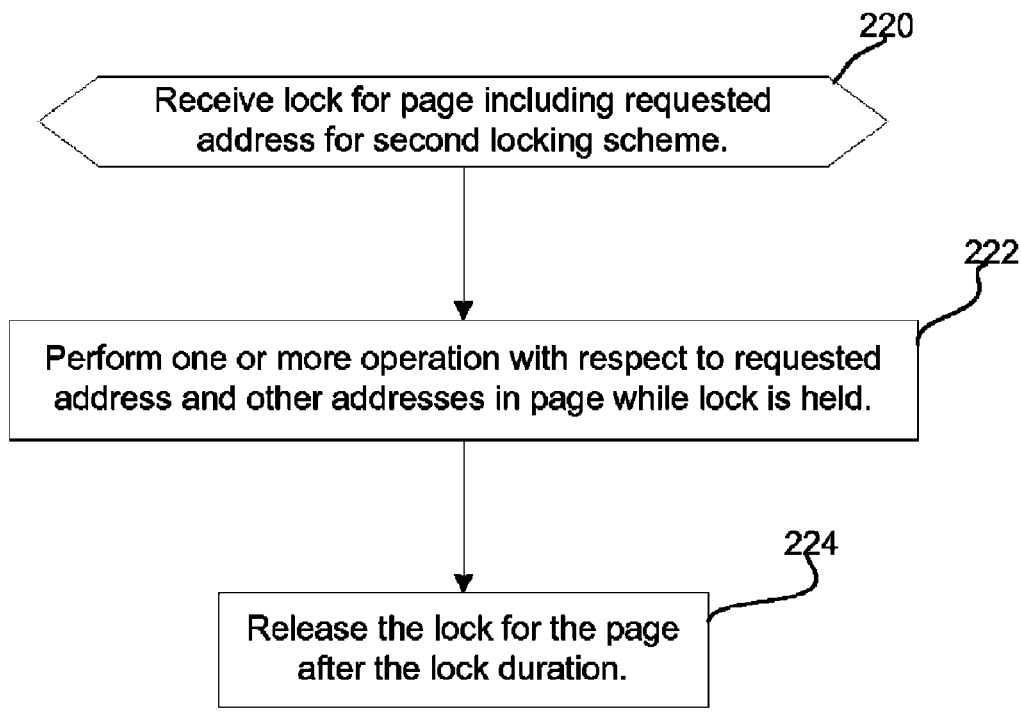

FIG. 9 illustrates an embodiment of operations performed by processes 16 receiving a page level lock 80 as part of the second locking scheme. Upon receiving (at block 220) a page level lock 80 for the second locking scheme, the process 16 performs (at block 222) one or more operations with respect to the requested address and other addresses in the page 20 while the lock is held. The lock is released (at block 224) for the page after the lock duration 74.

Described embodiments provide techniques to change access parameters for processes and addresses in a shared memory in response to a non-deterministic access pattern that results in a condition or error. The access pattern, such as the locking scheme used, is changed to avoid those non-deterministic access patterns of memory addresses that resulted in the error. The described embodiments for preventing non-deterministic access patterns that result in errors may be performed by the operating system 10 during runtime operations when spawning multiple processes 16 across the processors 4 to perform application 12 operations with respect to a shared resource, such as a shared memory.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 2, 3, and 4 provide an embodiment of lock information. In alternative embodiments, the lock information shown in FIGS. 2, 3, and 4 may be arranged in alternative manners and include additional information.

The illustrated operations of FIGS. 6, 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. An article of manufacture comprising a computer readable medium implementing code in communication with a storage device and for performing operations, the operations comprising:
 monitoring processes accessing addresses of data in a storage device, wherein processes are granted access to the addresses according to a first locking scheme that indicates how to arbitrate access by processes to the addresses;

detecting a condition occurring in response to a pattern of processes accessing addresses;

in response to detecting the condition, performing:

determining one of the processes in the pattern and the address accessed by the determined process;

indicating in address information maintained for the determined address accessed by the determined process that a second locking scheme applies to the determined address, wherein the second locking scheme applies greater number of addresses of data in the storage device than the first locking scheme; and in response to receiving a lock request for a requested address of data in the storage device following the operations performed in response to the detecting of the condition, performing:

determining from the address information for the requested address the first or second locking scheme indicated for the requested address; and using the determined first or second locking scheme to grant access to the requested address.

2. The article of manufacture of claim 1, wherein the second locking scheme prevents the pattern of processes occurring that resulted in the detected condition.

3. The article of manufacture of claim 1, wherein the received lock request is from a requesting process, wherein the operations further comprise:

determining whether a lock is held for the requested address in response to determining that the first locking scheme applies; and granting the requesting process the lock for the requested address in response to determining that the lock is available.

4. The article of manufacture of claim 3, wherein the operations further comprise:

determining whether a lock is held for a block of addresses including the requested address in response to determining that the second locking scheme applies; and granting the requesting process the lock for the block of addresses to allow the requesting process to access the requested address in response to determining that the second locking scheme applies to the requesting process and the requested address.

5. The article of manufacture of claim 4, wherein the operations further comprise:

releasing, by the requesting process, the lock for the requested address in response to completing the operation with respect to the requested address when the first locking scheme applied.

6. The article of manufacture of claim 4, wherein the operations further comprise:

releasing, by the requesting process, the lock granted according to the second locking scheme after a lock duration.

7. The article of manufacture of claim 6, wherein the lock duration indicates at least one of a time period and a predetermined number of instructions executed by the requesting process.

8. The article of manufacture of claim 4, wherein the storage device comprises a memory device, wherein the block of addresses comprises a page of addresses in the memory device, and wherein the processes are spawned by an operating system to perform tasks for an application.

9. The article of manufacture of claim 1, wherein the detected condition comprises one of an execution error, bug, and deadlock.

10. The article of manufacture of claim 1, wherein detecting the condition occurring in response to the pattern of processes accessing addresses comprises:

logging information on each process accessing one of the addresses;

analyzing the logged processes in response to detecting the condition to determine the pattern of logged processes that resulted in the detected condition; and determining a first process of the logged processes in the determined pattern, wherein the second locking mechanism is indicated to apply to the determined address accessed by the determined first process.

11. The article of manufacture of claim 10, wherein the logged processes comprise processes granted exclusive access to the accessed address.

12. The article of manufacture of claim 1, further performing, in response to detecting the error condition, indicating the determined process in the address information maintained for the determined address.

13. The article of manufacture of claim 12, wherein the received lock request is from a requesting process, wherein in response to receiving the lock request for the requested address, further determining whether the address information for the requested address indicates the requesting process, wherein the second locking scheme is used in response to determining that the address information for the requested address indicates both the requesting process and the second locking scheme.

14. The article of manufacture of claim 13, wherein the first locking scheme is used in response to determining that the first locking scheme is indicated in the address information for the requested address or in response to determining that the address information for the requested address does not indicate the requesting process.

15. The system of claim 12, wherein the received lock request is from a requesting process, wherein in response to receiving the lock request for the requested address, further determining whether the address information for the requested address indicates the requesting process, wherein the second locking scheme is used in response to determining that the address information for the requested address indicates both the requesting process and the second locking scheme.

16. The system of claim 15, wherein the first locking scheme is used in response to determining that the first locking scheme is indicated in the address information for the requested address or in response to determining that the address information for the requested address does not indicate the requesting process.

17. The method of claim 15, further performing, in response to detecting the error condition, indicating the determined process in the address information maintained for the determined address.

18. The method of claim 17, wherein the received lock request is from a requesting process, wherein in response to receiving the lock request for the requested address, further determining whether the address information for the requested address indicates the requesting process, wherein the second locking scheme is used in response to determining that the address information for the requested address indicates both the requesting process and the second locking scheme.

19. The method of claim 18, wherein the first locking scheme is used in response to determining that the first locking scheme is indicated in the address information for the requested address or in response to determining that the address information for the requested address does not indicate the requesting process.

20. A system, comprising:
an operating system spawning processes to execute instructions;
a shared memory accessible to the processes;
a lock manager to perform operations, the operations comprising:
monitoring processes accessing addresses of data in the shared memory, wherein processes are granted access to the addresses according to a first locking scheme that indicates how to arbitrate access by processes to the addresses;
detecting a condition occurring in response to a pattern of processes accessing addresses;
in response to detecting the condition, performing:
determining one of the processes in the pattern and the address accessed by the determined process;
indicating in address information maintained for the determined address accessed by the determined process that a second locking scheme applies to the determined address, wherein the second locking scheme applies a lock to a greater number of addresses of data than the first locking scheme; and
in response to receiving a lock request for a requested address of data following the operations performed in response to the detecting of the condition, performing:
determining from the address information for the requested address the first or second locking scheme indicated for the requested address; and
using the determined first or second locking scheme to grant access to the requested address.

21. The system of claim 20, wherein the second locking scheme prevents the pattern of processes occurring that resulted in the detected condition.

22. The system of claim 20, wherein the lock manager further performs:
determining whether a lock is held for the requested address in response to determining that the first locking scheme applies; and
granting the requesting process the lock for the requested address in response to determining that the lock is available.

23. The system of claim 22, wherein the lock manager further performs:
determining whether a lock is held for a block of addresses including the requested address in response to determining that the second locking scheme applies; and
granting the requesting process the lock for the block of addresses to allow the requesting process to access the requested address in response to determining that the second locking scheme applies to the requesting process and the requested address.

24. The system of claim 20, wherein the detected condition comprises one of an execution error, bug, and deadlock.

25. The system of claim 20, wherein the lock manager further performs, in response to detecting the error condition, indicating the determined process in the address information maintained for the determined address.

26. A computer implemented method, comprising:
monitoring processes accessing addresses of data in a storage device, wherein processes are granted access to the addresses according to a first locking scheme that indicates how to arbitrate access by processes to the addresses;
detecting a condition occurring in response to a pattern of processes accessing addresses;
in response to detecting the condition, performing:
determining one of the processes in the pattern and the address accessed by the determined process;
indicating in address information maintained for the determined address accessed by the determined process that a second locking scheme applies to the determined address, wherein the second locking scheme applies a lock to a greater number of addresses of data in the storage device than the first locking scheme; and
in response to receiving a lock request for a requested address of data in the storage device following the operations performed in response to the detecting of the condition, performing:
determining from the address information for the requested address the first or second locking scheme indicated for the requested address; and
using the determined first or second locking scheme to grant access to the requested address.

27. The method of claim 26, wherein the second locking scheme prevents the pattern of processes occurring that resulted in the detected condition.

28. The method of claim 26, further comprising:
determining whether a lock is held for the requested address in response to determining that the first locking scheme applies; and
granting the requesting process the lock for the requested address in response to determining that the lock is available.

29. The method of claim 28, further comprising:
determining whether a lock is held for a block of addresses including the requested address in response to determining that the second locking scheme applies; and
granting the requesting process the lock for the block of addresses to allow the requesting process to access the requested address in response to determining that the second locking scheme applies to the requesting process and the requested address.

30. The method of claim 26, wherein the detected condition comprises one of an execution error, bug, and a deadlock.

* * * * *